(12) United States Patent
Kimura et al.

(10) Patent No.: US 9,575,296 B2
(45) Date of Patent: Feb. 21, 2017

(54) ZOOM LENS AND IMAGE PICKUP DEVICE INCLUDING THE SAME

(71) Applicant: CANON KABUSHIKI KAISHA, Tokyo (JP)

(72) Inventors: Tomonori Kimura, Utsunomiya (JP); Shinji Yamasaki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 165 days.

(21) Appl. No.: 14/340,662

(22) Filed: Jul. 25, 2014

(65) Prior Publication Data

US 2015/0054988 A1 Feb. 26, 2015

(30) Foreign Application Priority Data

Aug. 22, 2013 (JP) ................. 2013-172023

(51) Int. Cl.
*G02B 15/16* (2006.01)
*G02B 15/177* (2006.01)
*G02B 13/04* (2006.01)

(52) U.S. Cl.
CPC ........... *G02B 15/177* (2013.01); *G02B 15/161* (2013.01); *G02B 13/04* (2013.01)

(58) Field of Classification Search
CPC ... G02B 15/177; G02B 15/161; G02B 15/122; G02B 13/04
USPC ................. 359/680, 682, 691–693, 689, 686
See application file for complete search history.

(56) References Cited

U.S. PATENT DOCUMENTS

| | | | |
|---|---|---|---|
| 8,023,199 B2 * | 9/2011 | Katakura | G02B 15/177 359/689 |
| 2006/0077565 A1 * | 4/2006 | Tomioka | G02B 15/177 359/680 |
| 2010/0091381 A1 | 4/2010 | Katakura | |
| 2010/0182702 A1 | 7/2010 | Watanabe et al. | |

FOREIGN PATENT DOCUMENTS

| | | |
|---|---|---|
| CN | 2604696 Y | 2/2004 |
| CN | 1755412 A | 4/2006 |
| JP | 2001-215411 A | 8/2001 |
| JP | 2002-196235 A | 7/2002 |
| JP | 2002-207166 A | 7/2002 |
| JP | 2002-543468 A | 12/2002 |
| JP | 2005-115309 A | 4/2005 |
| JP | 2005-134887 A | 5/2005 |
| JP | 2005-148435 A | 6/2005 |
| JP | 2005-308905 A | 11/2005 |
| JP | 2006-078535 A | 3/2006 |
| JP | 2006-113300 A | 4/2006 |

(Continued)

OTHER PUBLICATIONS

"Ohara Inc. : S-FPL." Ohara Inc. : S-FPL. Ohara Inc, n.d. Web. Mar. 4, 2016. <http://www.ohara-inc.co.jp/en/product/optical/list/s-fpl.html>.*

(Continued)

*Primary Examiner* — Zachary Wilkes
(74) *Attorney, Agent, or Firm* — Carter, DeLuca, Farrell & Schmidt, LLP

(57) ABSTRACT

A zoom lens is provided which has a wide angle of view and is bright and in which the entire lens system is compact and which can achieve high optical characteristic over the entire zoom range.

14 Claims, 9 Drawing Sheets

(56) References Cited

FOREIGN PATENT DOCUMENTS

| JP | 2007-212743 A | 8/2007 |
| JP | 2007-212847 A | 8/2007 |
| JP | 2008-203344 A | 9/2008 |
| JP | 2011-175174 A | 9/2011 |
| JP | 2013-242505 A | 12/2013 |

OTHER PUBLICATIONS

"Index of /en/product/optical/dl/data." Index of /en/product/optical/dl/data. Ohara Inc, Mar. 2, 2006. Web. Jun. 29, 2016.*
Chinese office action issued in corresponding application No. 201410408007.7 on Apr. 13, 2016.
Chinese Office Action issued in connection with CN Application No. 201410408007.7 on Aug. 22, 2016, 17 pages.
Japanese Office Action issued on Dec. 20, 2016 in related Japanese Patent Application No. 2013-172023 together with machine translation, 13 pages.

* cited by examiner

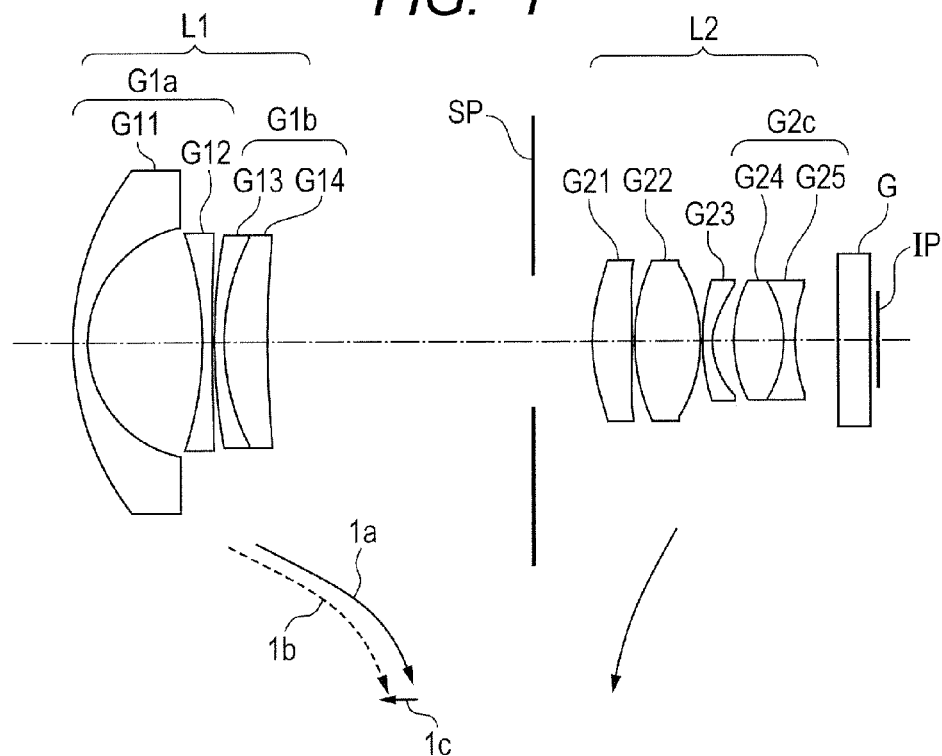
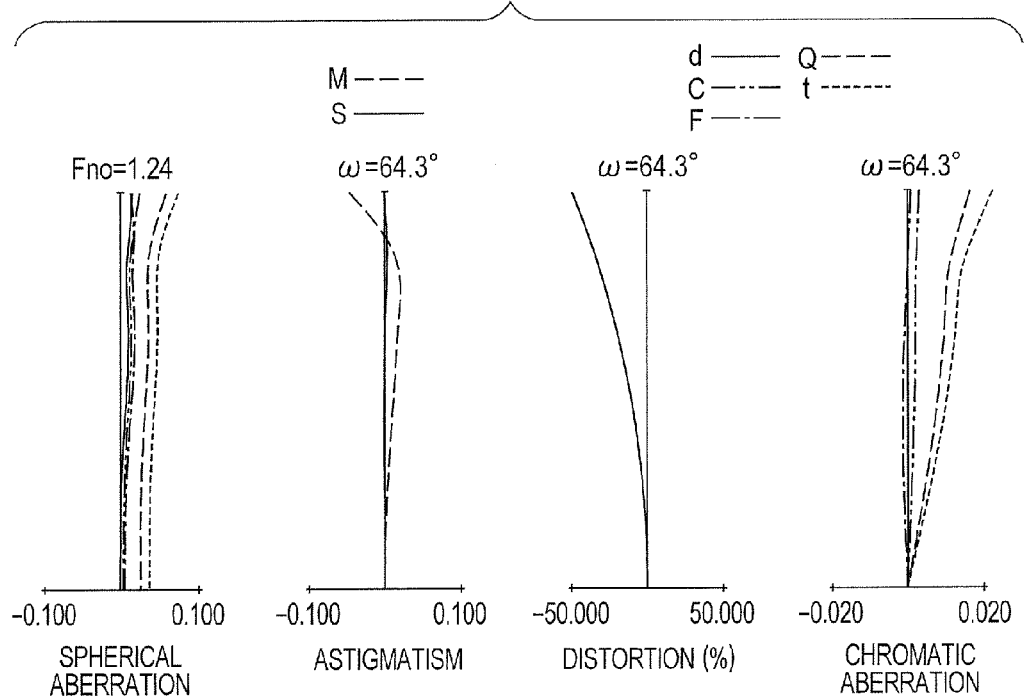

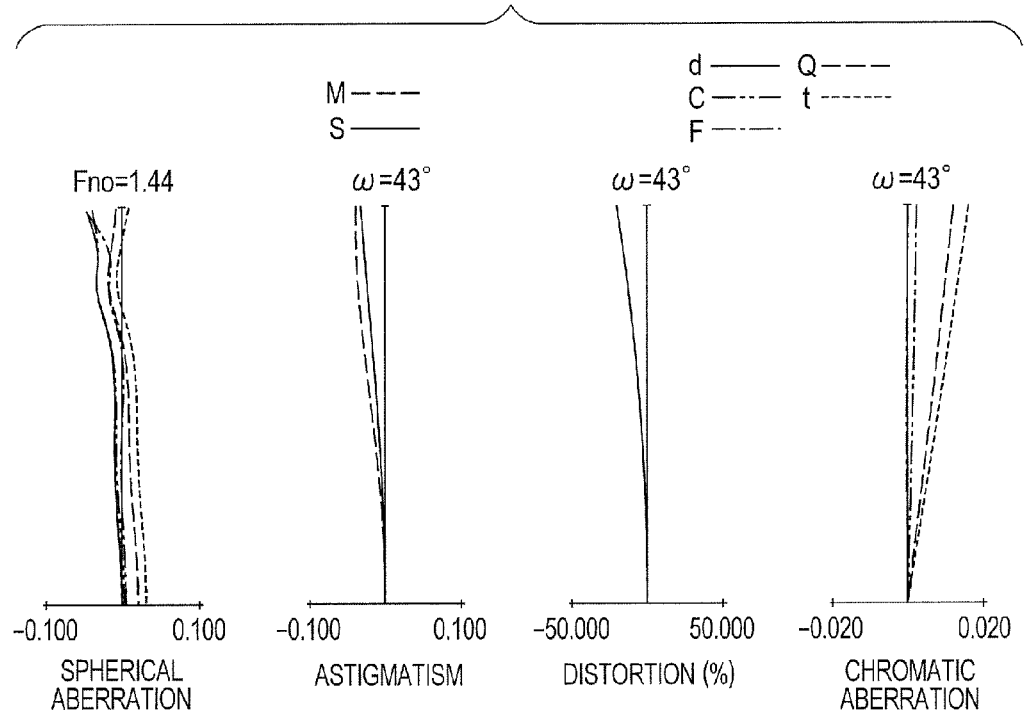
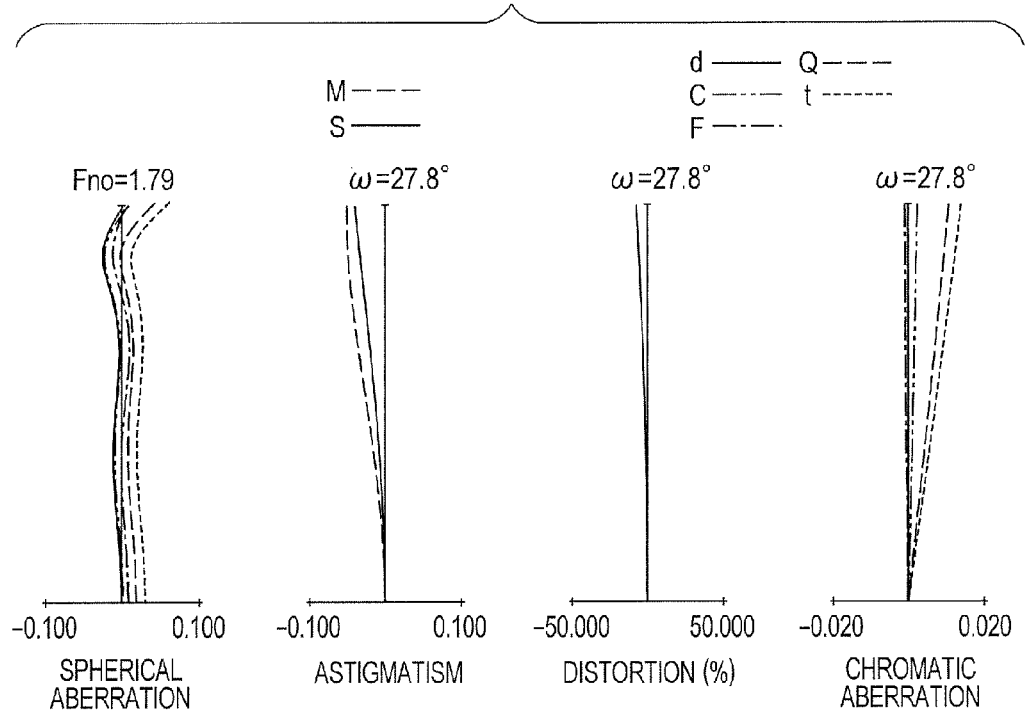

ZOOM LENS AND IMAGE PICKUP DEVICE INCLUDING THE SAME

BACKGROUND OF THE INVENTION

Field of the Invention

The present invention relates to a zoom lens and an image pickup device including the same and, in particular, to a zoom lens and an image pickup device suitable for use in image pickup optical systems of a digital still camera, a video camera, a security camera, a broadcast camera, a film camera, and the like.

Description of the Related Art

In recent years, an image pickup optical system included in an image pickup device including a solid-state image pickup element is desired to have high optical characteristic to an extent equivalent to supporting a high resolution solid-state image pickup element and further be capable of taking images at various magnifications.

A zoom lens for a security camera is desired to have a super wide angle of view and a small F-number. Furthermore, imaging of a subject in twilight time and nighttime uses not only visible light but also near infrared light. Accordingly, a degree of out-of-focus is required to be reduced in a wide wavelength range including near infrared light to visible light. Furthermore, the size of entire system is required to be small.

As a zoom lens configuration satisfying such demand, configurations of negative-lead type zoom lenses are known that include a lens unit having a negative refractive power arranged on the most object side. As to negative-lead type zoom lenses, Japanese Patent Application Laid-Open No. 2005-134887 and Japanese Patent Application Laid-Open No. 2011-175174 disclose zoom lenses that include, in sequential order from the object side to the image side: a first lens unit having a negative refractive power; and a second lens unit having a positive refractive power, wherein both the lens units are moved to perform zooming.

SUMMARY OF THE INVENTION

For achieving a zoom lens that has a wide angle of view, is bright and compact and has high optical characteristic over the entire zoom range, it is important to design appropriately the refractive powers of lens units and the lens configurations of the lens units. For instance, for achieving a zoom lens that has a small degree of out-of-focus, appropriately corrected chromatic aberration, and high optical characteristic in a wide wavelength range including visible light to near infrared light, it is important to appropriately design the lens configuration of a second lens unit, which is a main magnification unit, and lens materials from which the second lens unit is made.

A zoom lens of the present invention includes, in sequential order from an object side to an image side: a first lens unit having a negative refractive power; and a second lens unit having a positive refractive power, the first lens unit and the second lens unit moving along respective loci different from each other during zooming, wherein the second lens unit includes a positive lens PL satisfying conditional expressions, $$85.0 < \nu d,$$

$$-0.25 < \theta Ct - (0.0047 \times \nu d + 0.546) < -0.10, \text{ and}$$

$$\theta Ct = (nC - nt)/(nF - nC),$$

where nC, nt and nF are refractive indexes of a lens material for a C-line, a t-line and an F-line, respectively, and νd is an Abbe number for a d-line, and a conditional expression, $$1.3 < hw/fw < 3.0$$

is satisfied where hw is an incident height of marginal rays of an on-axis light flux passing through the positive lens PL at a wide angle end, and fw is a focal length of an entire system at the wide angle end.

Further features of the present invention will become apparent from the following description of exemplary embodiments with reference to the attached drawings.

BRIEF DESCRIPTION OF THE DRAWINGS

FIG. 1 is a lens sectional view of a zoom lens of Embodiment 1 at a wide angle end.

FIG. 2A is an aberration diagram of the zoom lens of Embodiment 1 at the wide angle end.

FIG. 4B is an aberration diagram of the zoom lens of Embodiment 2 at an intermediate zoom position.

FIG. 4C is an aberration diagram of the zoom lens of Embodiment 2 at a telephoto end.

DESCRIPTION OF THE EMBODIMENTS

Preferred embodiments of the present invention will now be described in detail in accordance with the accompanying drawings.

A zoom lens of the present invention and an image pickup device including the same are hereinafter described. The zoom lens of the present invention includes, in sequential order from an object side to an image side: a first lens unit having a negative refractive power; and a second lens unit having a positive refractive power. The first lens unit and the second lens unit move along respective loci different from each other during zooming.

Figure 2B:
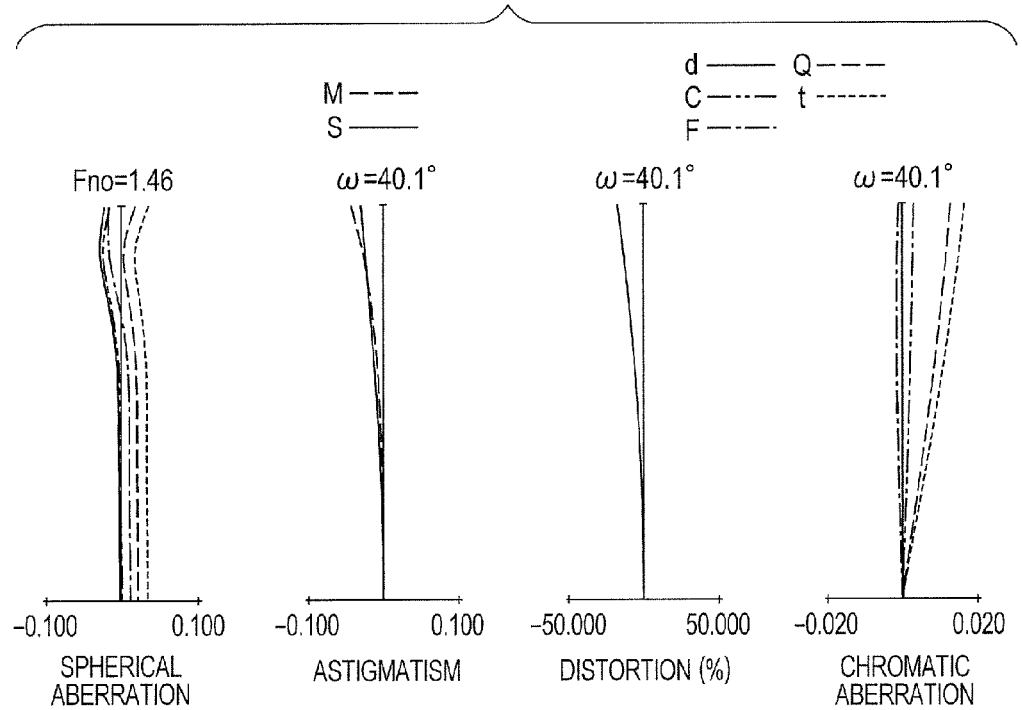
FIG. 2B is an aberration diagram of the zoom lens of Embodiment 1 at an intermediate zoom position.
Figure 2C:
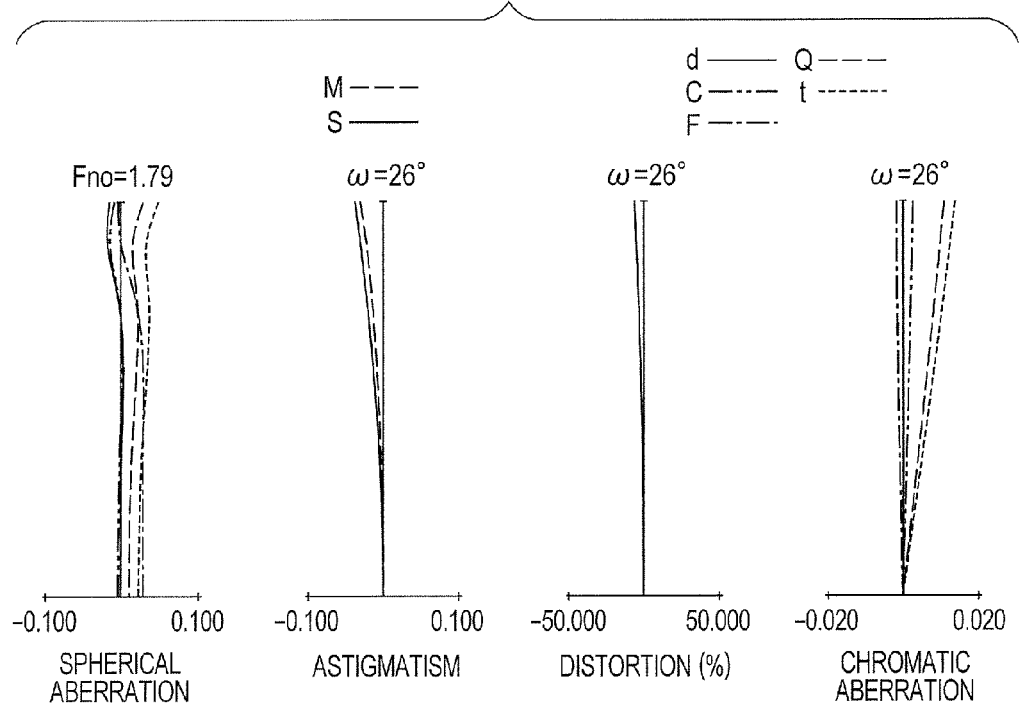
FIG. 2C is an aberration diagram of the zoom lens of Embodiment 1 at a telephoto end.

FIG. 1 is a lens sectional view of a zoom lens of Embodiment 1 of the present invention at a wide angle end (short focal length end). FIGS. 2A, 2B and 2C are aberration diagrams of the zoom lens of Embodiment 1 of the present invention at the wide angle end, an intermediate zoom position and a telephoto end (long focal length end), respectively. Embodiment 1 is a zoom lens that has a zoom ratio of 2.30 and an aperture ratio of 1.24-1.79.

Figure 3:
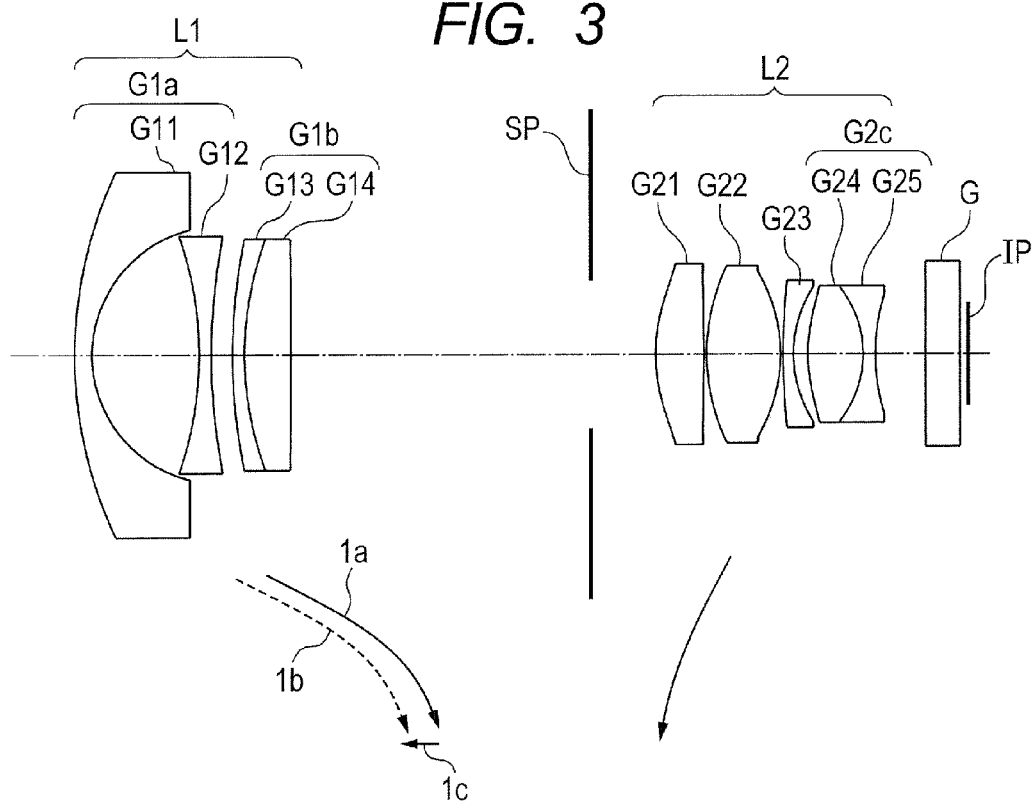
FIG. 3 is a lens sectional view of a zoom lens of Embodiment 2 at a wide angle end.
Figure 4A:
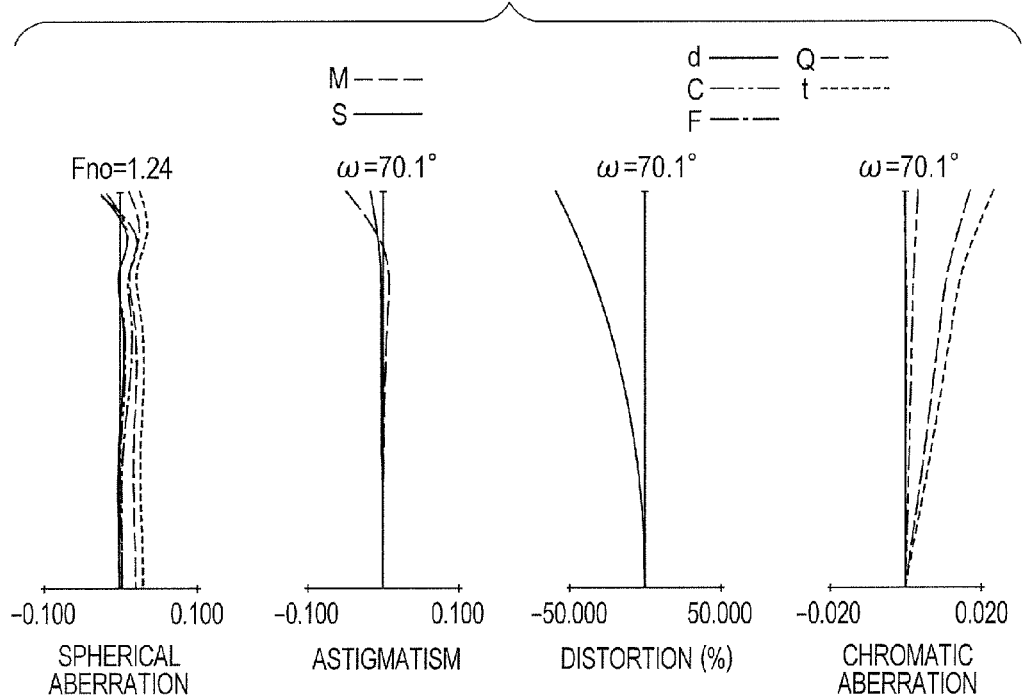
FIG. 4A is an aberration diagram of the zoom lens of Embodiment 2 at the wide angle end.

FIG. 3 is a lens sectional view of a zoom lens of Embodiment 2 of the present invention at a wide angle end. FIGS. 4A, 4B and 4C are aberration diagrams of the zoom lens of Embodiment 2 of the present invention at the wide angle end, an intermediate zoom position and a telephoto end, respectively. Embodiment 2 is a zoom lens that has a zoom ratio of 2.32 and an aperture ratio of 1.24-1.79.

Figure 5:
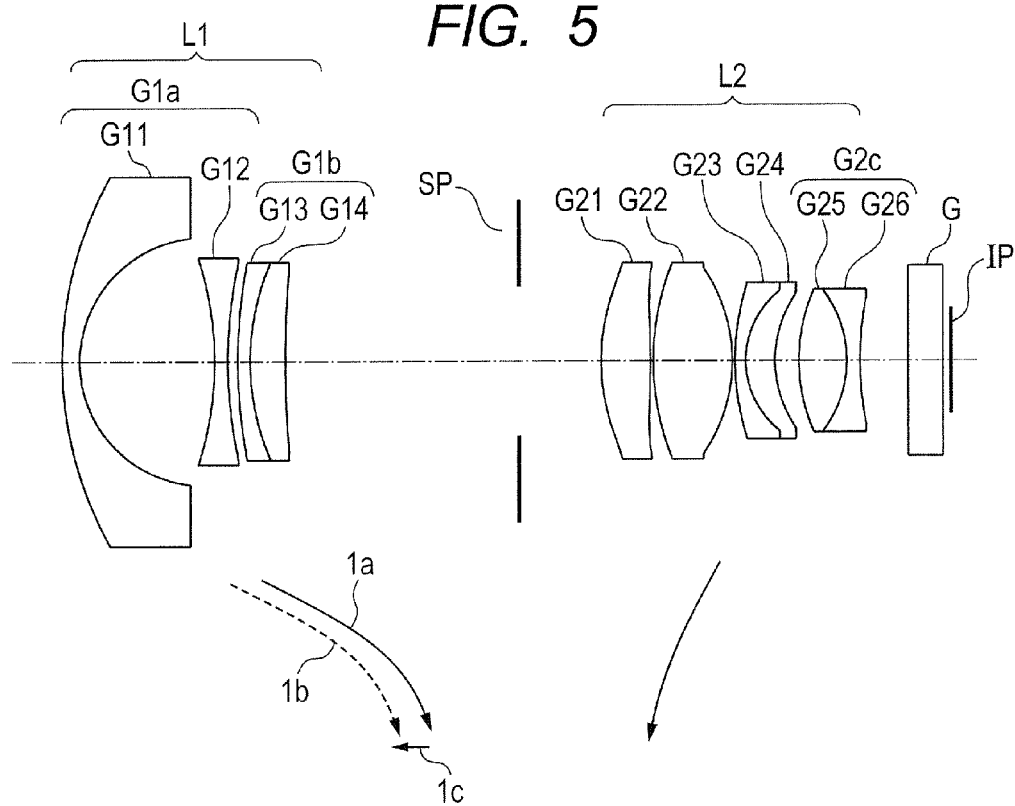
FIG. 5 is a lens sectional view of a zoom lens of Embodiment 3 at a wide angle end.
Figure 6A:
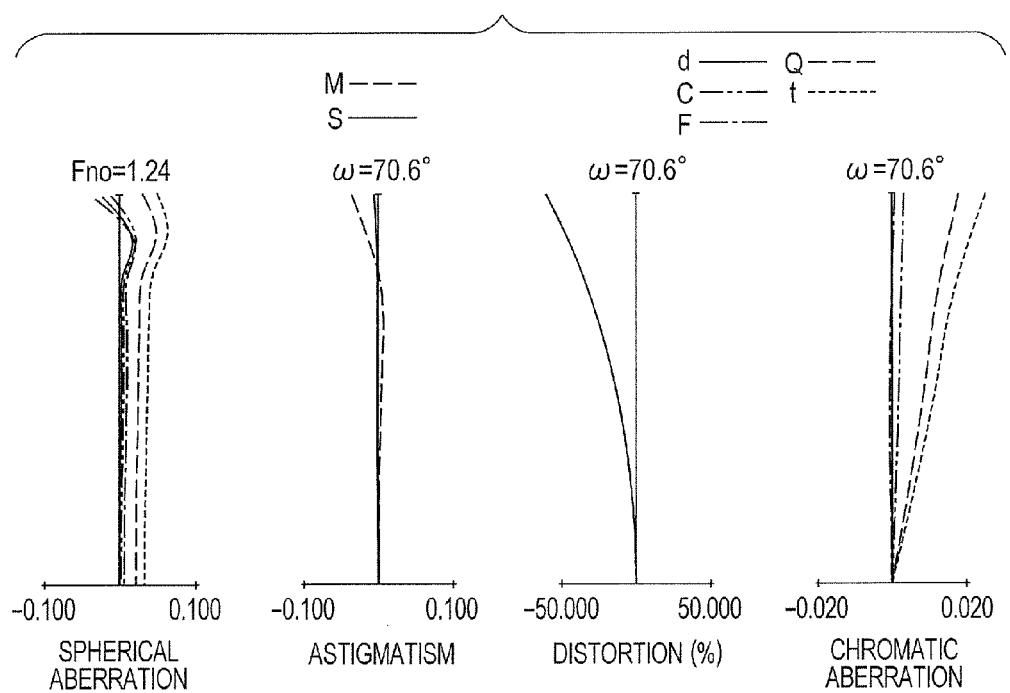
FIG. 6A is an aberration diagram of the zoom lens of Embodiment 3 at the wide angle end.
Figure 6B:
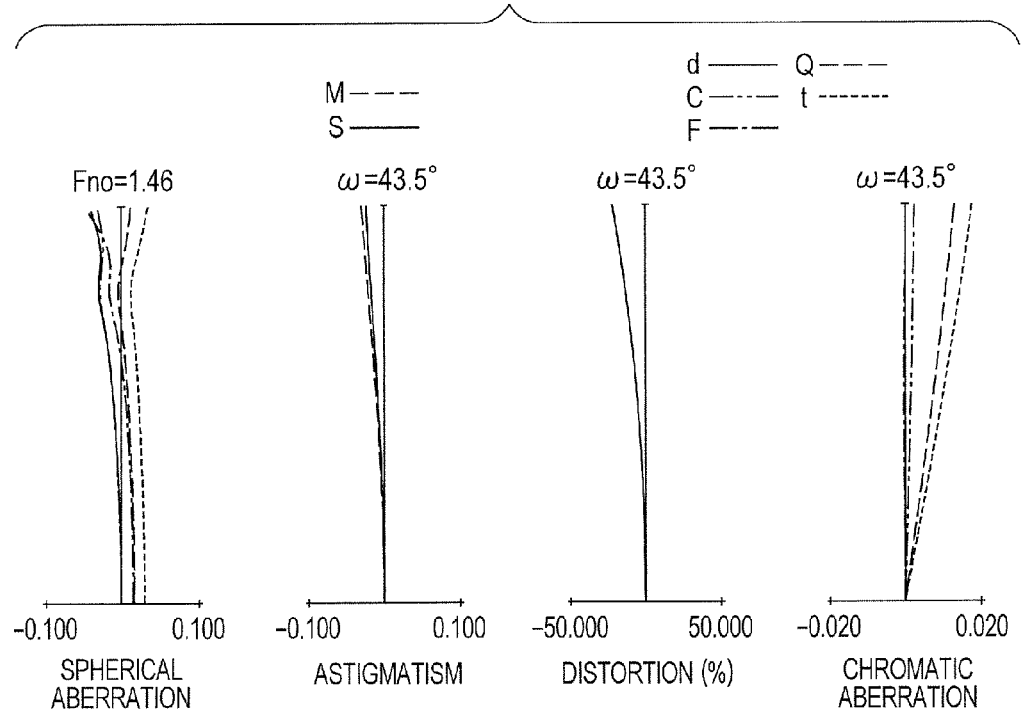
FIG. 6B is an aberration diagram of the zoom lens of Embodiment 3 at an intermediate zoom position.
Figure 6C:
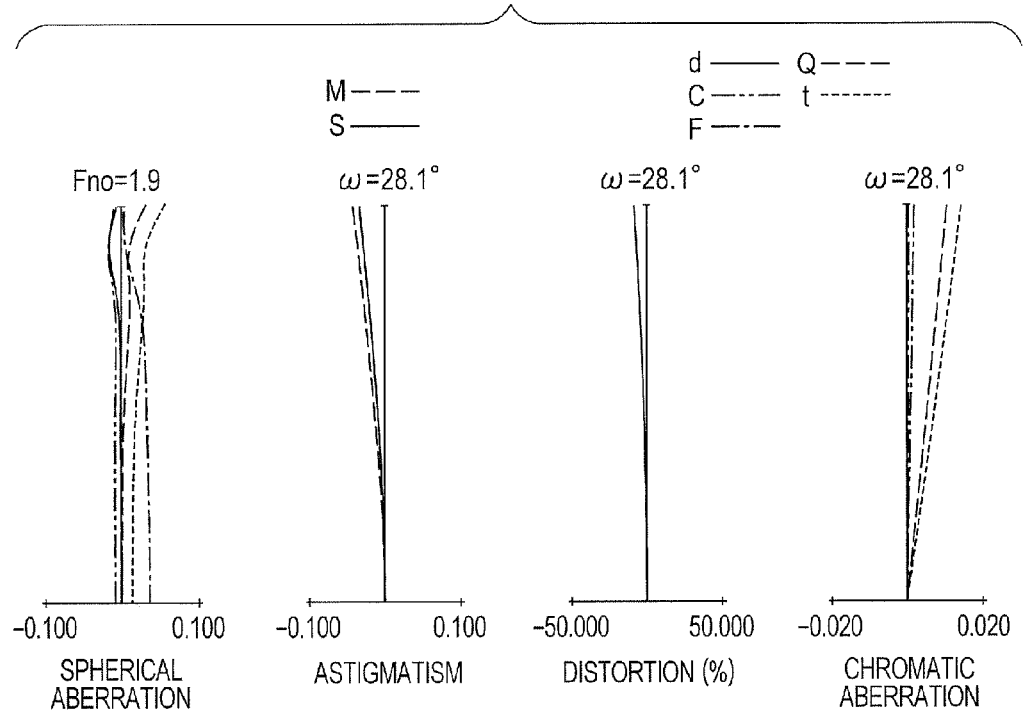
FIG. 6C is an aberration diagram of the zoom lens of Embodiment 3 at a telephoto end.

FIG. 5 is a lens sectional view of a zoom lens of Embodiment 3 of the present invention at a wide angle end. FIGS. 6A, 6B and 6C are aberration diagrams of the zoom lens of Embodiment 3 of the present invention at the wide angle end, an intermediate zoom position and a telephoto end, respectively. Embodiment 3 is a zoom lens that has a zoom ratio of 2.31 and an aperture ratio of 1.24-1.90.

Figure 7:
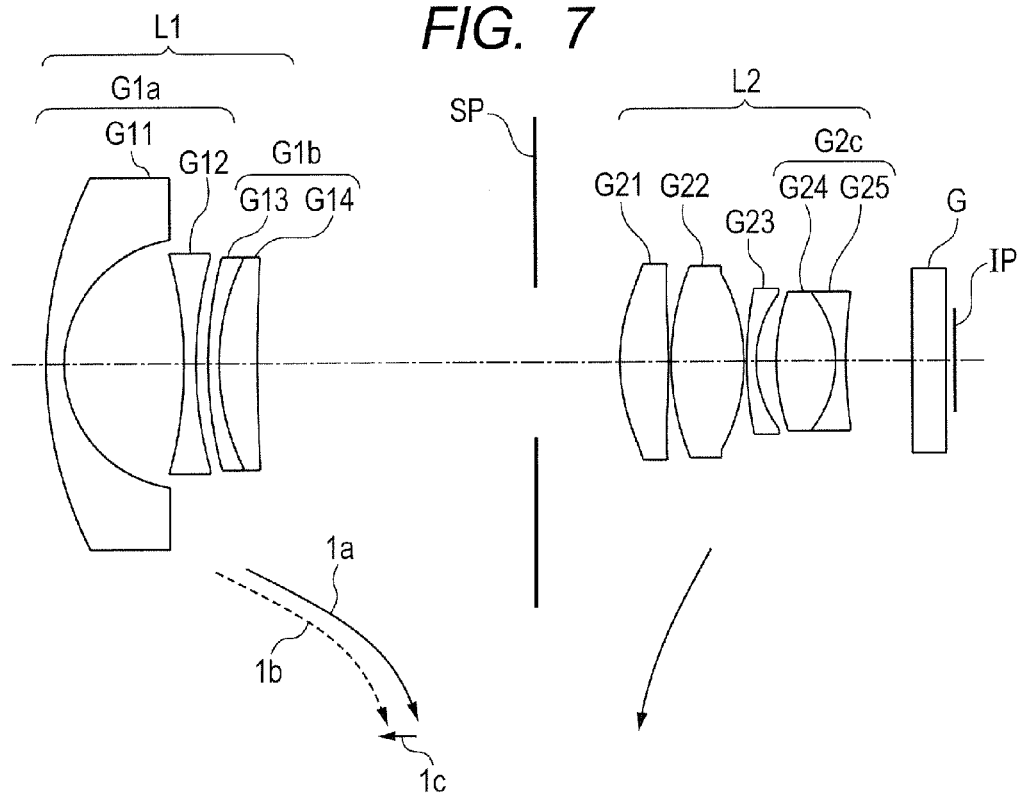
FIG. 7 is a lens sectional view of a zoom lens of Embodiment 4 at a wide angle end.
Figure 8A:
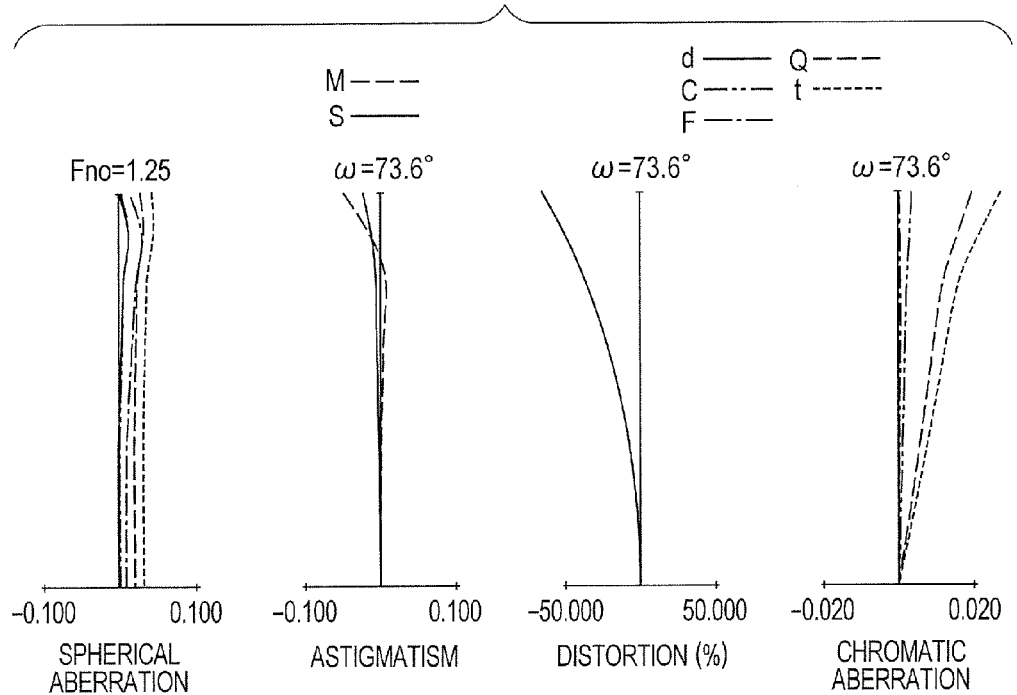
FIG. 8A is an aberration diagram of the zoom lens of Embodiment 4 at the wide angle end.
Figure 8B:
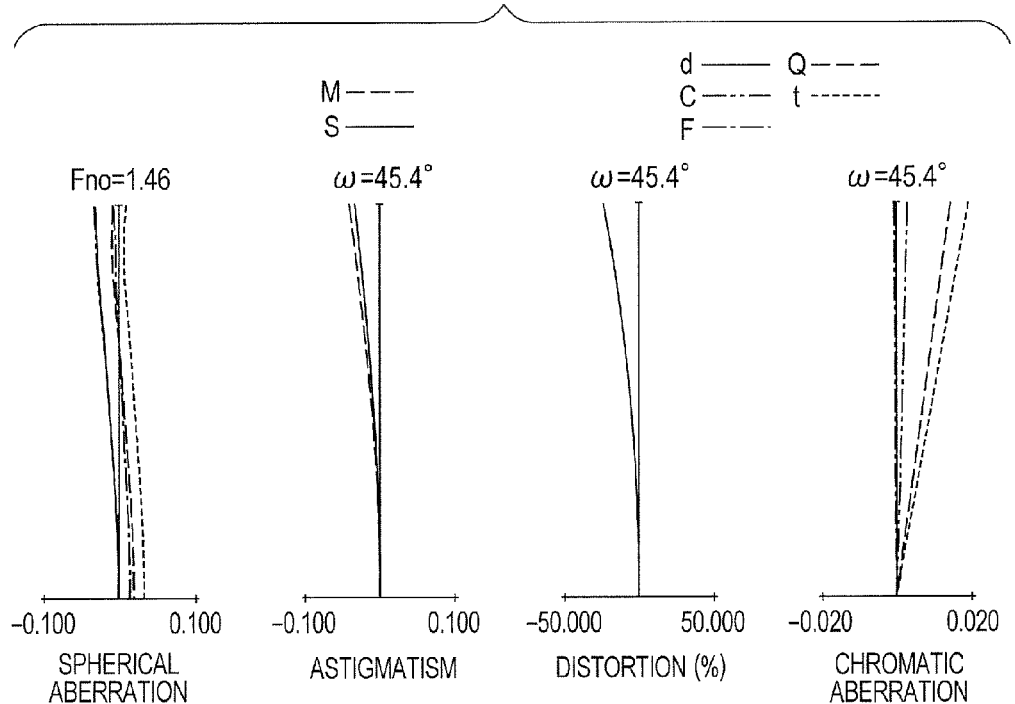
FIG. 8B is an aberration diagram of the zoom lens of Embodiment 4 at an intermediate zoom position.
Figure 8C:
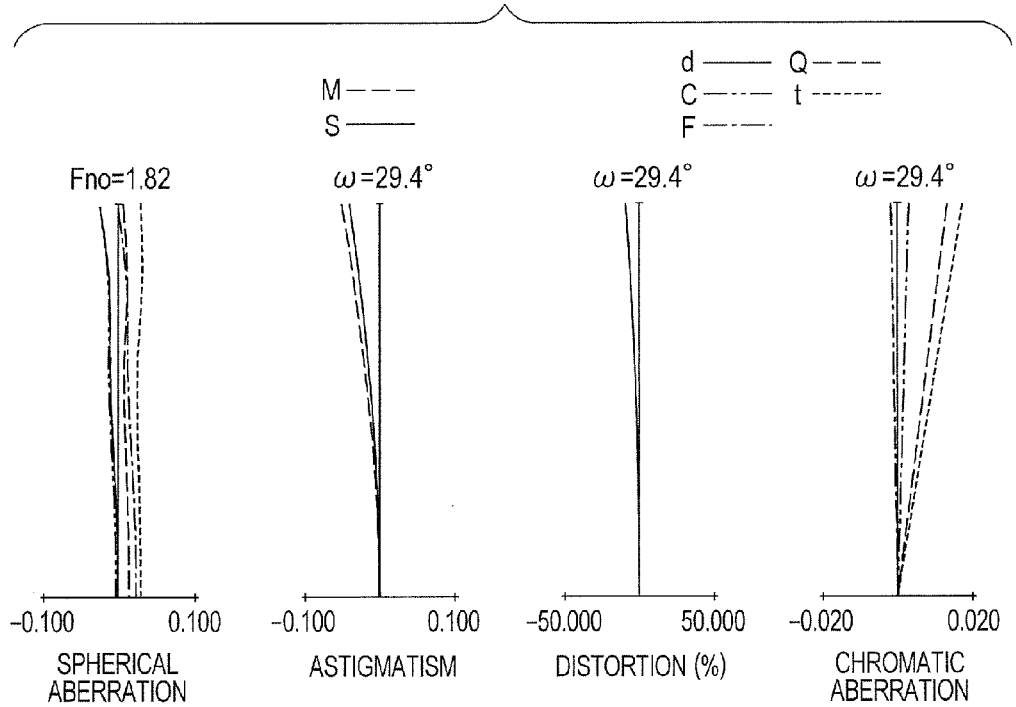
FIG. 8C is an aberration diagram of the zoom lens of Embodiment 4 at a telephoto end.

FIG. 7 is a lens sectional view of a zoom lens of Embodiment 4 of the present invention at a wide angle end. FIGS. 8A, 8B and 8C are aberration diagrams of the zoom lens of Embodiment 4 of the present invention at the wide angle end, an intermediate zoom position and a telephoto end, respectively. Embodiment 4 is a zoom lens that has a zoom ratio of 2.30 and an aperture ratio of 1.25-1.82.

Figure 9:
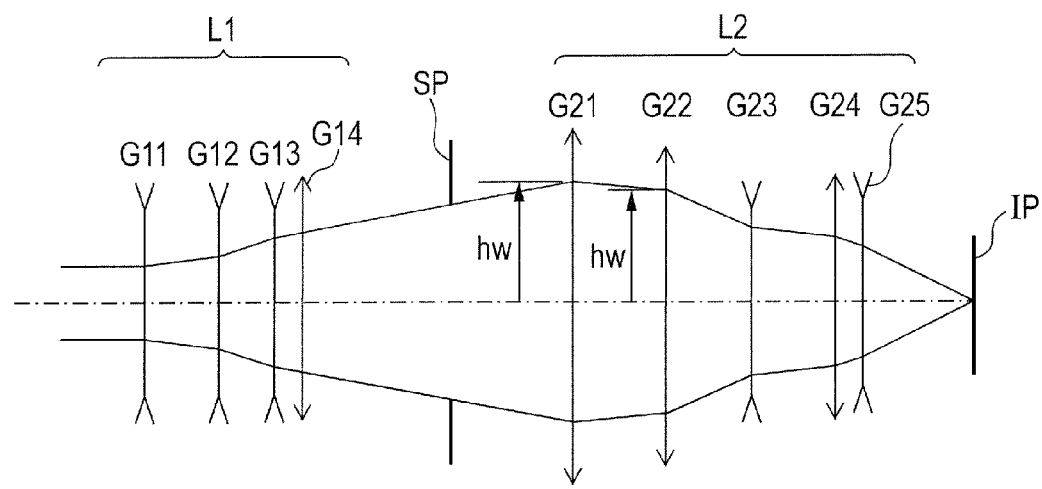
FIG. 9 is a diagram illustrating an incident height where marginal rays of an on-axis light flux pass through the zoom lens of the present invention.
Figure 10:
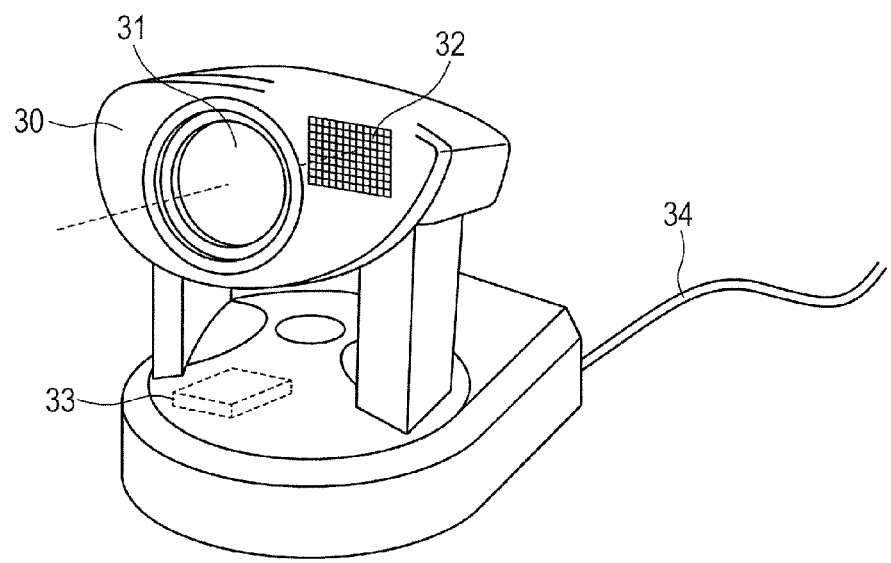
FIG. 10 illustrates an embodiment in a video camera according to the present invention.

FIG. 9 is a diagram illustrating an incident height where marginal rays of an on-axis light flux pass through the zoom lens of the present invention. FIG. 10 is a schematic diagram of a main part of a video camera including the zoom lens according to the present invention.

The zoom lens of each embodiment is an image pickup optical system included in an image pickup device. In the lens sectional view, the left indicates an object side (front) and the right indicates an image side (rear). The zoom lens of each embodiment may be included in an optical apparatus, such as a projector. In this case, the left indicates screen and the right is an image to be projected. Each lens sectional view illustrates a first lens unit L1 having a negative refractive power (optical power=the reciprocal of the focal length), and a second lens unit L2 having a positive refractive power. An F-number determination member SP (hereinafter, also called "aperture stop") serves as an aperture stop that determines the open F-number.

An optical block G corresponds to any of an optical filter, a faceplate, a crystal low-pass filter and an infrared cut filter. In the case of use as an imaging optical system of any of a video camera and a digital still camera, an image pickup plane of a solid-state image pickup element (photo-electric conversion element), such as a CCD sensor or a CMOS sensor, is arranged on an image plane IP.

Arrows indicate movement loci of the respective lens units during zooming from the wide angle end to the telephoto end. An arrow 1a concerning the first lens unit L1 indicates a movement locus during zooming from the wide angle end to the telephoto end in the case where the focus is on infinity. An arrow 1b indicates a movement locus during zooming from the wide angle end to the telephoto end in the case of the focus at a short distance. An arrow 1c indicates the movement direction during focusing from infinity to a short distance.

In spherical aberration diagrams and lateral chromatic aberration diagrams among the aberration diagrams, solid lines d indicate d-lines (587.56 nm), chain double-dashed lines C indicate C-lines (656.27 nm), alternate long and short dashed lines F indicate F-lines (486.13 nm), broken lines Q indicate Q lines (900 nm), dotted lines t indicate t-lines (1013.98 nm). In astigmatism diagrams, dotted lines M indicate meridional image planes for d-lines, the solid lines S indicate sagittal image planes for the d-lines. As to the distortion, illustration is for d-lines. As to the lateral chromatic aberration, illustration is for the C-line, F-line, wavelength of 900 nm and t-line, with respect to the d-line. Fno is an F-number. ω is a half angle of view (degrees).

The zoom lens of the present invention has high optical characteristic over the entire zoom range at a wide angle of view even though the size of the entire system is small. In particular this zoom lens has a small degree of out-of-focus in a near infrared range with respect to a visible light range. The zoom lens of the present invention is a negative-lead type zoom lens that has a lens unit having a negative refractive power at the most object side. The negative-lead type zoom lens includes a first lens unit L1 having a negative refractive power and changes the interval between lens units, thereby achieving variation in power. This configuration achieves a wider angle and reduction in size of the entire system.

The power is changed by moving the second lens unit L2 having the positive refractive power arranged on the image side, and the accompanying variation in image plane is corrected by the first lens unit L1 having the negative refractive power on the most object side. Adoption of only two movable lens units achieves a configuration that can easily achieve a simple barrel structure and is advantageous for reducing the size of the entire system.

The second lens unit L2 includes one or more positive lenses. At least one positive lens among the one or more positive lenses satisfies the following conditional expressions, which are conditional expressions (1), (2), (3) and (A). Here, as to the at least one positive lens, hw is an incident height where marginal rays of an on-axis light flux pass at the wide angle end; vd is the Abbe number of the material for the d-line, and nC, nt and nF are the refractive indexes of the material for C-line, t-line and F-line, respectively; and fw is the focal length of the entire system at the wide angle end.

$$1.3 < hw/fw < 3.0 \tag{1}$$

$$85.0 < vd \tag{2}$$

$$-0.25 < \theta Ct - (0.0047 \times vd + 0.546) < -0.10 \tag{3}$$

$$\theta Ct = (nC - nt)/(nF - nC) \tag{A}$$

θCt is hereinafter called a partial dispersion ratio. Next, the technical meaning of the foregoing conditional expressions is described. The conditional expressions (1) to (3) are for achieving a zoom lens that has high optical characteristic over the entire zoom range even though the size of the entire system is small and, in particular, has a small degree of out-of-focus at a near infrared range with respect to a visible light range and a wide angle of view, and is bright.

For correcting the axial chromatic aberration in a wide wavelength range and reducing out-of-focus, it is appropriate to adopt a material having a large Abbe number, i.e., a small dispersion, as the material of the positive lenses that have a large incident height (hw), which is a height of the marginal rays of an on-axis light flux from the optical axis. As illustrated in FIG. 9, in the zoom lens of each embodiment, the incident height (hw) of the marginal rays of an on-axis light flux is large at the second lens unit L2.

Accordingly, the optical property of the material of the positive lens of the second lens unit L2 largely affects the axial chromatic aberration. The Abbe number νd of the material is defined by the following expression (B) using the refractive indexes nd, nF and nC for the d-line, F-line and C-line, respectively, in the visible light range.

$$\nu d=(nd-1)/(nF-nC) \tag{B}$$

Thus, selection of the lens material with reference to the Abbe number νd facilitates correction of the chromatic aberration in the visible light range. However, the Abbe number νd does not define the characteristics in the near infrared range. Accordingly, selection of the material of the lens only with reference to the value of the Abbe number νd cannot necessarily perform correction in the near infrared range having a wavelength of 900 nm or more in an appropriate manner.

To address this problem, each embodiment focuses attention on the partial dispersion ratio θCt for the t-line in addition to the Abbe number νd, and selects the lens material. This configuration reduces the axial chromatic aberration in the visible light range and the near infrared range to thereby reduce the out-of-focus at a wide wavelength range. Furthermore, selection of such materials facilitates correction of the lateral chromatic aberration in the near infrared range.

Meanwhile, a low-dispersion material having a high Abbe number νd typically has a low refractive index. Accordingly, the curvature of the lens surface is required to be high to acquire a prescribed refractive power. This configuration increases various aberrations. In particular, the spherical aberration tends to increase, and it is difficult to achieve a large aperture ratio. It is thus important to selectively adopt the foregoing material as a positive lens that has a large incident height hw of a light beam and largely affects the axial chromatic aberration, for correcting the spherical aberration.

The conditional expression (1) relates to the positive lens that is included in the second lens unit L2 to which the foregoing material is applied. The foregoing material is selectively adopted into the positive lens where the incident height hw of marginal rays of an on-axis light flux satisfies the conditional expression (1). This configuration facilitates appropriate correction of the axial chromatic aberration and the spherical aberration in the visible light range to the near infrared range. If the foregoing material is adopted into the positive lens having an incident height hw below the lower limit of the conditional expression (1), the second lens unit L2 causes a larger spherical aberration.

The conditional expression (1) is to facilitate achieving a wide angle of view. If the focal length of the entire system at the wide angle end is too long to cause the conditional expression (1) to fall below the lower limit, it becomes difficult to achieve a wide angle of view. In contrast, if the foregoing material is adopted into the positive lens having a high incident height hw that causes the conditional expression (1) to exceed the upper limit, the lens thickness is required to be large for securing the edge of the lens. This configuration increases the total lens length, and it becomes difficult to decrease the size of the entire system. Furthermore, this configuration increases the spherical aberration, and it becomes difficult to correct the aberration through the other lenses.

The conditional expressions (2) and (3) define the characteristics of the material adopted into the positive lens included in the second lens unit L2 that satisfies the conditional expression (1). If a material that has a low Abbe number falling below the lower limit of the conditional expression (2), i.e., large dispersion, is adopted into the positive lens, it becomes difficult to appropriately correct the axial chromatic aberration in the visible light range.

A material having a relationship between the partial dispersion ratio θCt and the Abbe number νd falling below the lower limit of the conditional expression (3) can facilitate suppressing the axial chromatic aberration in the near infrared range to be small. However, under the present circumstances, there are a small number of optical materials achieving such characteristics. In contrast, if the partial dispersion ratio θCt is too large exceeding the upper limit of the conditional expression (3), the difference of the refractive indexes in wavelengths in the near infrared range becomes too large, and it becomes difficult to correct the axial chromatic aberration.

The above configuration of each embodiment achieves a zoom lens that has high optical characteristic over the entire zoom range even though the size of the entire system is small and, in particular, has a small degree of out-of-focus at a near infrared range with respect to a visible light range and a wide angle of view, and is bright. According to a desirable configuration, the numerical value ranges of the conditional expressions (1) to (3) are set as follows.

$$1.4<hw/fw<2.7 \tag{1a}$$

$$88<\nu d \tag{2a}$$

$$-0.22<\theta Ct-(0.0047\times\nu d+0.546)<-0.11 \tag{3a}$$

According to a further desirable configuration, the advantageous effects represented by the foregoing conditional expressions can be exerted to the maximum by setting the numerical value ranges of the conditional expressions (1a) to (3a) as follows.

$$1.5<hw/fw<2.4 \tag{1b}$$

$$90<\nu d \tag{2b}$$

$$-0.20<\theta Ct-(0.0047\times\nu d+0.546)<-0.12 \tag{3b}$$

A zoom lens can be achieved that has high optical characteristic over the entire zoom range even though the size of the entire system is small and, in particular, has a small degree of out-of-focus at a near infrared range with respect to a visible light range and a wide angle of view, and is bright.

In each embodiment, according to a desirable configuration, at least one of the following conditions is satisfied. It is provided that the average value of Abbe numbers for the d-line of the materials of all the positive lenses, among the positive lenses included in the second lens unit L2 that satisfy the foregoing conditional expression (1), (1a) or (1b) is νdave, the second lens unit L2 has a focal length f2, and the entire system has a focal length ft at the telephoto end. The first lens unit L1 includes a cemented lens G1b that includes a positive lens G14 and a negative lens G13 cemented to each other and has a positive refractive power as a whole. The Abbe number of the material of the positive lens G14 is defined as νdp. The Abbe number of the material of the negative lens G13 is defined as νdn.

The most image-side lens among the lenses configuring the second lens unit L2 is a cemented lens G2c that includes a positive lens and a negative lens cemented to each other in sequential order from the object side to the image side. The cemented lens G2c has a focal length f2c. The first lens unit L1 has a focal length f1. The second lens unit L2 includes, in sequential order from the object side to the image side, a positive lens G21 and a positive lens G22. The positive lens G21 has a focal length f21. The positive lens G22 has a focal length f22. The system has a total lens length TLw at the wide angle end. Here, the total lens length is acquired by adding an air-equivalent back focus to the length from the first lens surface on the object side to the last lens surface.

The first lens unit L1 includes, in sequential order from the object side to the image side: a meniscus-shaped negative lens G11 having a convex surface on the object side; a biconcave-shaped negative lens G12; and a cemented lens G1b that includes a negative lens G13 and a positive lens G14 cemented to each other and has a positive refractive power as a whole. A combined system G1a of the negative lens G11 and the negative lens G12 has a combined focal length f1a. The cemented lens G1b has a focal length f1b. In this case, according to a desirable configuration, at least one of the following conditional expressions is satisfied.

$$74.0 < \nu dave \quad (4)$$

$$1.2 < f2/ft < 2.0 \quad (5)$$

$$0.016 < 1/\nu dp - 1/\nu dn < 0.060 \quad (6)$$

$$1.2 < f2c/f2 < 4.0 \quad (7)$$

$$0.9 < |f1|/ft < 1.8 \quad (8)$$

$$2.5 < f2/fw < 4.0 \quad (9)$$

$$0.8 < f21/f22 < 1.5 \quad (10)$$

$$5.1 < TLw/f2 < 7.0 \quad (11)$$

$$0.10 < -f1a/f1b < 0.22 \quad (12)$$

Next, the technical meaning of the foregoing conditional expressions is described.

The conditional expression (4) defines the materials of all positive lenses where the on-axis rays pass at a position with a large incident height (largely apart from the optical axis) through the second lens unit L2. If the Abbe number of the material of the positive lens is small falling below the lower limit of the conditional expression (4), i.e., the dispersion is large, the positive lens causes a large axial chromatic aberration in the visible light range. It thus becomes difficult to correct the aberration through lenses other than the second lens unit L2.

The conditional expression (5) defines the refractive power of the second lens unit L2. If the focal length of the second lens unit L2 is too small falling below the lower limit of the conditional expression (5), i.e., the refractive power is too high, this configuration is advantageous to reduction in size of the entire lens system. However, the second lens unit L2 causes a large axial chromatic aberration and a large spherical aberration. It thus becomes difficult to maintain high optical characteristic over the entire zoom range. In contrast, if the refractive power of the second lens unit L2 is too low, exceeding the upper limit of the conditional expression (5), the amount of movement during zooming becomes large. It thus becomes difficult to reduce the size of the entire lens system.

The conditional expression (6) defines the materials of the negative lens G13 and the positive lens G14 that configure the cemented lens G1b included in the first lens unit L1. The cemented lens G1b has a positive refractive power as a whole, is included in the first lens unit L1 having the negative refractive power, corrects the lateral chromatic aberration on the wide angle side, and corrects the axial chromatic aberration on the telephoto end.

If the difference in Abbe number of the materials between the negative lens G13 and the positive lens G14 is too small falling below the lower limit of the conditional expression (6), this configuration is unfavorable because the achromatic effect of the cemented lens G1b becomes small, and the above-mentioned chromatic aberration is increased. If the difference in Abbe number is too large exceeding the upper limit of the conditional expression (6), the correction effect of the above-mentioned chromatic aberration becomes excessive. It thus becomes difficult to achieve high optical characteristic over the entire zoom lens.

The conditional expression (7) defines the refractive power of the most image-side cemented lens G2c of the second lens unit L2. The cemented lens G2c has a large incident height where an off-axis light beam passes. Accordingly, this lens has a role of correcting various aberrations for off-axis rays, such as the lateral chromatic aberration, field curvature, and astigmatism.

If the refractive power of the cemented lens G2c is too high, falling below the lower limit of the conditional expression (7), with respect to the refractive power of the second lens unit L2, the various aberrations for the foregoing off-axis rays, such as lateral chromatic aberration, become too large through the second lens unit L2. It thus becomes difficult to correct the aberrations through the other lenses. In contrast, if the refractive power of the cemented lens G2c is too low, exceeding the upper limit of the conditional expression (7), the refractive powers of the positive lens G21 and the positive lens G22 of the second lens unit L2 on the object side are required to be increased. As a result, the axial chromatic aberration in the visible light range and the infrared range increases.

The conditional expression (8) defines the refractive power of the first lens unit L1. If the absolute value of the negative refractive power of the first lens unit L1 is too high, falling below the lower limit of the conditional expression (8), the various aberrations, such as the lateral chromatic aberration, field curvature and astigmatism, increase on the wide angle side. In contrast, if the absolute value of the negative refractive power of the first lens unit L1 is too small, exceeding the upper limit of the conditional expression (8), the amount of movement of the first lens unit L1 for correcting variation of the image plane due to zooming increases, the total lens length becomes long, and the effective diameter of front lens increases.

The conditional expression (9) defines the refractive power of the second lens unit L2. If the refractive power of the second lens unit L2 is too high, falling below the lower limit of the conditional expression (9), this configuration is advantageous to reduction in size of the entire lens system. However, the second lens unit L2 largely causes the axial chromatic aberration and the spherical aberration. It thus becomes difficult to maintain high optical characteristic over the entire zoom range. In contrast, if the refractive power of the second lens unit L2 is too low, exceeding the upper limit of the conditional expression (9), the amount of movement during zooming increases. It thus becomes difficult to reduce the size of the entire lens system.

The conditional expression (10) defines the sharing ratio of the refractive powers of the positive lens G21 and the positive lens G22 of the second lens unit L2, the lenses G21 and G22 being arranged in sequential order from the object side to the image side. As illustrated in FIG. 9, both the positive lens G21 and the positive lens G22 have high incident heights where the marginal rays of an on-axis light flux pass. Accordingly, this configuration largely affects the spherical aberration and the axial chromatic aberration. Accordingly, it is important to causes the positive lens G21 and the positive lens G22 to share the positive refractive power, for achieving a large aperture ratio and appropriate correction of the axial chromatic aberration in a wide range from the visible light range to the near infrared range.

If the refractive power of the positive lens G21 is too high, falling below the lower limit of the conditional expression (10), in comparison with the refractive power of the positive lens G22, the positive lens G21 largely causes the spherical aberration and the axial chromatic aberration. It thus becomes difficult to correct these various aberrations through the other lenses. In contrast, if the refractive power of the positive lens G22 is too high, exceeding the upper limit of the conditional expression (10), in comparison with the refractive power of the positive lens G21, the positive lens G22 largely causes the spherical aberration and the axial chromatic aberration. It thus becomes difficult to correct these aberrations through the other lenses.

The conditional expression (11) relates to reduction in size of the total lens length at the wide angle end. If the refractive power of the second lens unit L2 is too low falling below the lower limit of the conditional expression (11), the amount of movement of the second lens unit L2 due to zooming becomes too long, and the total lens length becomes long. In contrast, if the refractive power of the second lens unit L2 is too high exceeding the upper limit of the conditional expression (11), the second lens unit L2 largely causes the axial chromatic aberration and the spherical aberration. It thus becomes difficult to maintain high optical characteristic over the entire zoom range. If the upper limit of the conditional expression (11) is exceeded, the total lens length TLw becomes too large at the wide angle end, thereby increasing the size of the entire system.

The conditional expression (12) defines the refractive power of the combined system G1a including the negative lens G11 and the negative lens G12 on the object side of the first lens unit L1, and the refractive power of the cemented lens G1b that includes the negative lens G13 and the positive lens G14 cemented to each other and disposed nearer to the image than the system G1a and has the positive refractive power as a whole.

If the absolute value of the negative refractive power of the combined system G1a is too large, falling below the lower limit of the conditional expression (12), the combined system G1a causes too large a positive lateral chromatic aberration coefficient at the wide angle end. It thus becomes difficult to correct the coefficient through the cemented lens G1b. In contrast, if the positive refractive power of the cemented lens G1b is too high exceeding the upper limit of the conditional expression (12) (if the absolute value of the refractive power is too large), the negative refractive power of the entire first lens unit L1 becomes too weak.

As a result, the amount of movement of the first lens unit L1 for correcting the variation of the image plane due to zooming increases, the total lens length increases and the effective diameter of front lens becomes large. According to a further desirable configuration, the numerical value ranges of the conditional expressions (4) to (12) are set as follows.

$$74.5 < vdave \tag{4a}$$

$$1.25 < f2/ft < 1.8 \tag{5a}$$

$$0.024 < 1/vdp - 1/vdn < 0.050 \tag{6a}$$

$$1.4 < f2c/f2 < 3.0 \tag{7a}$$

$$1.0 < |f1|/ft < 1.6 \tag{8a}$$

$$2.75 < f2/fw < 3.9 \tag{9a}$$

$$0.9 < f21/f22 < 1.4 \tag{10a}$$

$$5.2 < TLw/f2 < 6.5 \tag{11a}$$

$$0.12 < -f1a/f1b < 0.21 \tag{12a}$$

According to a more desirable configuration, the numerical value ranges of the conditional expressions (5a) to (12a) are set as follows, thereby securely exerting the advantageous effects represented by the conditional expressions.

$$1.3 < f2/ft < 1.7 \tag{5b}$$

$$0.030 < 1/vdp - 1/vdn < 0.042 \tag{6b}$$

$$1.6 < f2c/f2 < 2.5 \tag{7b}$$

$$1.1 < |f1|/ft < 1.5 \tag{8b}$$

$$3.00 < f2/fw < 3.85 \tag{9b}$$

$$0.95 < f21/f22 < 1.35 \tag{10b}$$

$$5.3 < TLw/f2 < 6.0 \tag{11b}$$

$$0.14 < -f1a/f1b < 0.20 \tag{12b}$$

As described above, each embodiment can achieve a zoom lens that has high optical characteristic over the entire zoom range and a wide angle of view, and is bright even though the size of the entire system is small. For instance, a zoom lens can be achieved that has a total angle of view of about 100° and an F-number of about 1.2 at the wide angle end and can support an image pickup element having the number of pixels in conformity with a full HD or more. A desirable configuration in each embodiment is as follows. That is, the second lens unit L2 includes, in sequential order from the object side to the image side: a positive lens G21, a positive lens G22, a negative lens component G23, and a cemented lens G2c including a positive lens G24 and a negative lens G25 cemented to each other.

Here, the lens component is defined as a single lens or a cemented lens including multiple lenses cemented to each other. The foregoing configuration of the second lens unit L2 facilitates suppressing the axial chromatic aberration, and the field curvature and astigmatism due to zooming, and facilitates achieving a large aperture ratio while maintaining high optical characteristic over the entire zoom range.

The first lens unit L1 includes, in sequential order from the object side to the image side: a meniscus-shaped negative lens G11 having a convex surface on the object side; a biconcave-shaped negative lens G12; a cemented lens G1b that includes a negative lens G13 and a positive lens G14 cemented to each other and has a positive refractive power as a whole. The negative refractive power is shared by the three negative lenses, thereby facilitating achievement of a wide angle of view. Furthermore, adoption of the cemented lens G1b having the positive refractive power reduces the lateral chromatic aberration near the wide angle end and the axial chromatic aberration near the telephoto end, thereby facilitating achievement of high optical characteristic with reduced color blurring over the entire zoom range.

An aperture stop SP is arranged after the first lens unit L1, and immovable during zooming. The immovability of the aperture stop SP during zooming negates the need to newly provide an actuator for zoom movement, and facilitates reduction in size of the entire system.

The configuration of the lens of each embodiment is hereinafter described. In each embodiment, the first lens unit L1 includes: the meniscus-shaped negative lens G11 having a convex surface on the object side; the biconcave-shaped negative lens G12; the meniscus-shaped negative lens G13 having a convex surface on the object side; and the positive lens G14 in meniscus shape or in biconvex shape having a convex surface on the object side. The negative lens G13 and the positive lens G14 have a cemented configuration. An appropriate difference in Abbe number between the materials of both the lenses is configured, thereby effectively correcting the chromatic aberration. The negative lens G11 adopts a material having a refractive index exceeding 2.0, which facilitates reduction in size of the entire system.

The second lens unit L2 includes: the positive lens G21 having a convex surface on the object side; the biconvex-shaped positive lens G22 having a higher refractive power on the image side than on the object side; and the negative lens component G23 having a convex surface on the object side. This unit further includes the cemented lens G2c that includes the biconvex-shaped positive lens G24 and the biconcave-shaped negative lens G25 cemented to each other and has a positive refractive power as a whole.

In each embodiment, a low dispersion material is adopted into the positive lens G21 having a high incident height (hw) of the marginal rays of an on-axis light flux, and the positive lens G22, thereby reducing the axial chromatic aberration in the visible light range. Furthermore, in each embodiment, the positive lens G22 adopts a material satisfying the foregoing conditional expressions (2) and (3), and reduces the axial chromatic aberration over the wide range from the visible light range to the near infrared light range.

More specifically, in Embodiment 1, a material manufactured by Ohara, Inc. having a trade name S-FPL52 (nd=1.45600, vd=90.3, θCt=0.842), is adopted. In Embodiment 2, fluorite (nd=1.43387, vd=95.1, θCt=0.809) is adopted. In Embodiments 3 and 4, a material manufactured by Ohara, Inc. having a trade name S-FPL53 (nd=1.43875, vd=94.9, θCt=0.838), is adopted.

The negative lens component G23 included in the second lens unit L2 is a single negative lens in Embodiments 1, 2 and 4, and is a cemented lens that includes a meniscus-shaped negative lens having a convex surface on the object side and a meniscus-shaped positive lens having a convex surface on the object side, the lenses being cemented to each other in Embodiment 3. The configuration of the single lens facilitates achieving reduction in thickness of the second lens unit L2, which is advantageous to reduce the size of the total lens length. The configuration of the cemented lens facilitates correcting the axial chromatic aberration and the lateral chromatic aberration and, in turn, facilitates achieving a large aperture and high image quality.

In each embodiment, both the surfaces of the positive lens G21 have aspheric shapes, which appropriately correct various aberrations, such as the spherical aberration. In Embodiments 1, 2 and 4, the surface of the positive cemented lens G2c on the object side has an aspheric shape, which facilitates correcting the field curvature and the astigmatism.

In Embodiments 1 to 4, the second lens unit has an aspheric shape. Alternatively, the other lens unit may appropriately have a configuration with an aspheric surface. For instance, adoption of the aspheric surface into the negative lens G11 lens on the most object side facilitates correcting the off-axis aberrations, such as the distortion and astigmatism, because a light flux spreads at the position.

Next, an embodiment of a security camera (image pickup device) including the zoom lens of the present invention as an imaging optical system is described with reference to FIG. 10. FIG. 10 illustrates a security camera body 30, and an imaging optical system 31 including any of zoom lenses described in Embodiments 1 to 4. A solid-state image pickup element 32 (photo-electric conversion element), such as a CCD sensor or a CMOS sensor, is embedded in the camera body and receives light of a subject image formed by the imaging optical system 31. A memory 33 stores information corresponding to the subject image photo-electrically converted by the solid-state image pickup element 32. A network cable 34 is for transferring the subject image photo-electrically converted by the element 32.

As described above, according to each embodiment, the small-sized zoom lens that has high optical characteristic over the entire zoom range while having a wide angle, and the image pickup device including the same can be achieved. These embodiments are small-sized zoom lenses that have coverage of the maximum angle of view 2ω of about 100° and an Fno of about 1.2 at the wide angle end and can support image pickup elements for full HD or higher pixels, and the image pickup devices including the same. In each embodiment, the following configuration may be adopted.

The shapes and number of lenses are not limited to those described in each embodiment; appropriate change is to be made.

The configuration in which the aperture stop SP moves during zooming is adopted.

The material of the aspheric lens is not limited to glass; alternatively, a hybrid type aspheric lens having an aspheric shape made of a resin material on a spherical lens surface (an aspheric component is mounted), or an aspheric lens made of a plastic material is adopted.

Some of lenses and a part of lens units are moved to have a component perpendicular to the optical axis, thereby correcting image blurring due to vibration, such as of unintentional hand movement.

In the case of adoption into the image pickup device including the solid-state image pickup element, the distortion and chromatic aberration are corrected by a correcting unit through an electric image processing.

The desirable embodiments of the present invention have been described above. However, the present invention is not limited to these embodiments and optical specifications (angle of view and Fno). Instead, various modifications and changes may be made within the gist thereof.

Next, Numerical Examples 1 to 4 corresponding to respective Embodiments 1 to 4 of the present invention are described. In each numerical example, i indicates the order of an optical surface from the object side. ri indicates the curvature radius of the i-th optical surface (i-th surface). di indicates the interval between the i-th surface and the (i+1)-th surface. ndi and vdi respectively indicate the refractive index and the Abbe number of the material of the i-th optical member for the d-line. θCt indicates the value defined by the expression (A). hw indicates the incident height where the marginal rays of an on-axis light flux pass at the wide angle end through the second lens unit L2.

The back focus (BF) is a value acquired by aerially converting the length from the lens final surface to the paraxial image plane. The total lens length is a value acquired by adding the back focus (BF) to the length from the lens forefront surface to the lens final surface. The unit of length is millimeter. k is the eccentricity. A4, A6, A8, A10 and A12 are aspheric coefficients. x is a displacement in the optical axis direction at a position of a height h from the optical axis with reference to a surface apex.

Here, the aspheric shape is represented as follows.

$$x=(h^2/R)/[1+\{1-(1+k)(h/R)^2\}^{1/2}]+A4h^4+A6h^6+A8h^8+A10h^{10}+A12h^{12},$$

where R is the paraxial curvature radius, ω (half angle of view) is a numerical value related to imageable angle of view in consideration of the amount of distortion. Table 1 illustrates the correspondence with the foregoing conditional expressions in each numerical example.

Numerical Example 1

Unit mm

Surface Data

| Surface Number | r | d | nd | vd | θCt | hw |
|---|---|---|---|---|---|---|
| 1 | 17.569 | 0.90 | 2.00100 | 29.1 | 0.684 | — |
| 2 | 7.348 | 7.15 | | | | — |
| 3 | −21.372 | 0.60 | 1.83481 | 42.7 | 0.756 | — |
| 4 | 201.467 | 0.15 | | | | — |
| 5 | 38.561 | 0.60 | 1.71300 | 53.9 | 0.819 | — |
| 6 | 14.235 | 2.70 | 1.94595 | 18.0 | 0.632 | — |
| 7 | 72.218 | (Variable) | | | | — |
| 8 (Stop) | ∞ | (Variable) | | | | — |
| 9* | 11.292 | 2.50 | 1.58313 | 59.4 | 0.827 | 4.670 |
| 10* | −46.529 | 0.15 | | | | 4.624 |
| 11 | 12.168 | 4.10 | 1.45600 | 90.3 | 0.843 | 4.655 |
| 12 | −9.110 | 0.15 | | | | 4.436 |
| 13 | 12.888 | 0.60 | 1.80809 | 22.8 | 0.660 | — |
| 14 | 4.905 | 1.34 | | | | — |
| 15* | 8.576 | 3.12 | 1.85135 | 40.1 | 0.736 | 2.870 |
| 16 | −6.839 | 0.70 | 1.67270 | 32.1 | 0.705 | 2.302 |
| 17 | 9.737 | (Variable) | | | | — |
| 18 | ∞ | 2.00 | 1.52000 | 61.4 | 0.833 | — |
| 19 | ∞ | 0.50 | | | | — |
| Image Plane | ∞ | | | | | |

Aspheric Data

Ninth Surface

K = 6.86073e−001  A4 = −3.04750e−004  A6 = −1.59282e−006
A8 = 2.20598e−007  A10 = −1.37235e−008

Tenth Surface

K = −1.14143e+002  A4 = 2.71603e−004  A6 = 9.84372e−006
A8 = 7.07373e−008  A10 = −6.77491e−009

Fifteenth Surface

K = 1.61114e+000  A4 = −3.13703e−004  A6 = 5.60899e−007
A8 = −5.19513e−007  A10 = 2.40838e−008

Various Pieces of Data
Zoom Ratio 2.30

| | Wide-angle | Intermediate | Telephoto |
|---|---|---|---|
| Focal Length | 2.84 | 4.32 | 6.54 |
| F-number | 1.24 | 1.46 | 1.79 |
| Half Angle of View (degree) | 46.57 | 34.78 | 24.65 |
| Image Height | 3.00 | 3.00 | 3.00 |
| Total Lens Length | 49.52 | 41.15 | 36.89 |
| BF | 4.49 | 5.91 | 8.02 |
| d7 | 16.60 | 8.22 | 3.97 |
| d8 | 3.68 | 2.27 | 0.15 |
| d17 | 2.68 | 4.09 | 6.21 |

Zoom Lens Unit Data

| Unit | Start Surface | Focal Length |
|---|---|---|
| 1 | 1 | −9.22 |
| 2 | 9 | 8.80 |

Numerical Example 2

Unit mm

Various Numerical Value f2c = 14.93, f21 = 15.84, f22 = 12.16, TLw = 49.52, f1a = −7.07, f1b = 44.71

Surface Data

| Surface Number | r | d | nd | vd | θCt | hw |
|---|---|---|---|---|---|---|
| 1 | 24.997 | 1.00 | 2.00100 | 29.1 | 0.684 | — |
| 2 | 7.524 | 6.23 | | | | — |
| 3 | −21.024 | 0.70 | 1.69680 | 55.5 | 0.833 | — |
| 4 | 35.907 | 1.23 | | | | — |
| 5 | 33.508 | 0.70 | 1.83481 | 42.7 | 0.756 | — |
| 6 | 19.300 | 2.70 | 1.94595 | 18.0 | 0.632 | — |
| 7 | −577.343 | (Variable) | | | | — |
| 8 (Stop) | ∞ | (Variable) | | | | — |
| 9* | 9.887 | 2.82 | 1.55332 | 71.7 | 0.816 | 4.884 |
| 10* | −57.903 | 0.15 | | | | 4.834 |
| 11 | 12.063 | 4.30 | 1.43387 | 95.1 | 0.809 | 4.779 |
| 12 | −9.369 | 0.15 | | | | 4.431 |
| 13 | 42.105 | 0.60 | 1.80518 | 25.4 | 0.668 | — |
| 14 | 7.286 | 0.85 | | | | — |
| 15* | 9.899 | 3.20 | 1.85135 | 40.1 | 0.736 | 2.992 |
| 16 | −6.282 | 0.70 | 1.71736 | 29.5 | 0.691 | 2.403 |
| 17 | 11.959 | (Variable) | | | | — |
| 18 | ∞ | 2.00 | 1.52000 | 61.4 | 0.833 | — |
| 19 | ∞ | 0.50 | | | | — |
| Image Plane | ∞ | | | | | |

Aspheric Data

Ninth Surface

K = 8.26660e−001  A4 = −3.71954e−004  A6 = −5.91269e−006
A8 = 2.16802e−007  A10 = −1.31069e−008

Tenth Surface

K = −6.70555e+001  A4 = 1.07505e−004  A6 = 4.77452e−006
A8 = −2.35776e−008  A10 = −2.80096e−009

Fifteenth Surface

K = 0.00000e+000  A4 = −4.49192e−004  A6 = −1.19662e−005
A8 = 5.93493e−009  A10 = −1.15904e−008

Various Pieces of Data
Zoom Ratio 2.32

| | Wide-angle | Intermediate | Telephoto |
|---|---|---|---|
| Focal Length | 2.64 | 4.04 | 6.13 |
| F-number | 1.24 | 1.44 | 1.79 |
| Half Angle of View (degree) | 48.65 | 36.62 | 26.08 |
| Image Height | 3.00 | 3.00 | 3.00 |
| Total Lens Length | 51.30 | 42.16 | 37.50 |
| BF | 4.74 | 6.19 | 8.36 |
| d7 | 17.45 | 8.31 | 3.65 |
| d8 | 3.77 | 2.32 | 0.15 |
| d17 | 2.93 | 4.37 | 6.55 |

Zoom Lens Unit Data

| Unit | Start Surface | Focal Length |
|---|---|---|
| 1 | 1 | −8.82 |
| 2 | 9 | 9.15 |

-continued

Unit mm

Various Numerical Value f2c = 17.97, f21 = 15.49, f22 = 12.94, TLw = 51.30, f1a = −5.80, f1b = 31.08

Numerical Example 3

Unit mm

Surface Data

| Surface Number | r | d | nd | vd | θCt | hw |
|---|---|---|---|---|---|---|
| 1 | 21.593 | 1.00 | 2.00100 | 29.1 | 0.684 | — |
| 2 | 7.052 | 7.65 | | | | — |
| 3 | −19.072 | 0.75 | 1.65160 | 58.5 | 0.827 | — |
| 4 | 26.591 | 0.57 | | | | — |
| 5 | 30.135 | 0.70 | | | | — |
| 6 | 14.131 | 1.99 | 1.94595 | 18.0 | 0.632 | — |
| 7 | 60.753 | (Variable) | | | | — |
| 8 (Stop) | ∞ | (Variable) | | | | — |
| 9* | 11.625 | 2.80 | 1.55332 | 71.7 | 0.816 | 5.087 |
| 10* | −36.871 | 0.15 | | | | 5.039 |
| 11 | 14.886 | 4.50 | 1.43875 | 94.9 | 0.838 | 5.076 |
| 12 | −9.332 | 0.15 | | | | 4.886 |
| 13 | 14.679 | 0.60 | 1.90366 | 31.3 | 0.696 | — |
| 14 | 5.065 | 1.68 | 1.60311 | 60.6 | 0.832 | 3.317 |
| 15 | 6.777 | 1.35 | | | | 2.962 |
| 16 | 9.963 | 2.73 | 1.83481 | 42.7 | 0.756 | 2.731 |
| 17 | −6.576 | 0.75 | 1.75520 | 27.5 | 0.680 | 2.243 |
| 18 | 19.244 | (Variable) | | | | — |
| 19 | ∞ | 2.00 | 1.52000 | 61.4 | 0.833 | — |
| 20 | ∞ | 0.45 | | | | — |
| Image Plane | ∞ | | | | | |

Aspheric Data

Ninth Surface

K = 9.98229e−001    A4 = −2.24918e−004    A6 = 1.13961e−006
A8 = 1.08949e−007    A10 = −8.62967e−009    A12 = 1.56632e−023

Tenth Surface

K = −7.72107e+001    A4 = 2.36680e−004    A6 = 1.04466e−005
A8 = 4.78774e−008    A10 = −6.14514e−009

Various Pieces of Data
Zoom Ratio 2.31

| | Wide-angle | Intermediate | Telephoto |
|---|---|---|---|
| Focal Length | 2.65 | 4.04 | 6.12 |
| F-number | 1.24 | 1.46 | 1.90 |
| Half Angle of View (degree) | 48.53 | 36.60 | 26.11 |
| Image Height | 3.00 | 3.00 | 3.00 |
| Total Lens Length | 49.80 | 43.04 | 40.19 |
| BF | 4.50 | 6.31 | 9.02 |
| d7 | 13.26 | 6.50 | 3.65 |
| d8 | 4.67 | 2.86 | 0.15 |
| d18 | 2.73 | 4.54 | 7.26 |

Zoom Lens Unit Data

| Unit | Start Surface | Focal Length |
|---|---|---|
| 1 | 1 | −7.12 |
| 2 | 9 | 9.28 |

-continued

Unit mm

Various Numerical Value f2c = 16.23, f21 = 16.31, f22 = 13.86, TLw = 49.80, f1a = −5.19, f1b = 34.09

Numerical Example 4

Unit mm

Surface Data

| Surface Number | r | d | nd | vd | θCt | hw |
|---|---|---|---|---|---|---|
| 1 | 24.341 | 1.05 | 2.00100 | 29.1 | 0.684 | — |
| 2 | 7.350 | 7.01 | | | | — |
| 3 | −24.345 | 0.70 | 1.77250 | 49.6 | 0.796 | — |
| 4 | 23.447 | 0.71 | | | | — |
| 5 | 24.178 | 0.65 | 1.77250 | 49.6 | 0.796 | — |
| 6 | 13.991 | 2.24 | 1.94595 | 18.0 | 0.632 | — |
| 7 | 123.813 | (Variable) | | | | — |
| 8 (Stop) | ∞ | (Variable) | | | | — |
| 9* | 10.671 | 2.86 | 1.55332 | 71.7 | 0.816 | 5.242 |
| 10* | −34.862 | 0.15 | | | | 5.171 |
| 11 | 15.038 | 4.26 | 1.43875 | 94.9 | 0.838 | 5.115 |
| 12 | −10.644 | 0.15 | | | | 4.801 |
| 13 | 21.294 | 0.55 | 1.80518 | 25.4 | 0.668 | — |
| 14 | 6.546 | 1.18 | | | | — |
| 15* | 12.081 | 3.48 | 1.76802 | 49.2 | 0.788 | 3.340 |
| 16 | −6.369 | 0.60 | 1.64769 | 33.8 | 0.712 | 2.807 |
| 17 | 27.848 | (Variable) | | | | — |
| 18 | ∞ | 2.00 | 1.52000 | 61.4 | 0.833 | — |
| 19 | ∞ | 0.50 | | | | — |
| Image Plane | ∞ | | | | | |

Aspheric Data

Ninth Surface

K = 8.26660e−001    A4 = −2.67156e−004    A6 = −2.86003e−006
A8 = 1.26883e−007    A10 = −5.69068e−009

Tenth Surface

K = −6.70555e+001    A4 = 1.33759e−004    A6 = 5.71826e−006
A8 = 2.57656e−008    A10 = −3.10014e−009

Fifteenth Surface

K = 0.00000e+000    A4 = −7.49330e−005    A6 = 2.86890e−008
A8 = −2.73099e−007    A10 = 1.14677e−008

Various Pieces of Data
Zoom Ratio 2.30

| | Wide-angle | Intermediate | Telephoto |
|---|---|---|---|
| Focal Length | 2.59 | 3.93 | 5.94 |
| F-number | 1.25 | 1.46 | 1.82 |
| Half Angle of View (degree) | 49.61 | 37.73 | 27.09 |
| Image Height | 3.04 | 3.04 | 3.04 |
| Total Lens Length | 52.50 | 44.48 | 40.73 |
| BF | 5.70 | 7.45 | 10.08 |
| d7 | 16.27 | 8.26 | 4.51 |
| d8 | 4.94 | 3.18 | 0.55 |
| d17 | 3.88 | 5.64 | 8.27 |

Zoom Lens Unit Data

| Unit | Start Surface | Focal Length |
|---|---|---|
| 1 | 1 | −7.52 |
| 2 | 9 | 9.83 |

-continued

Unit mm

Various Numerical Value f2c = 16.55, f21 = 15.10, f22 = 14.96, TLw = 52.50, f1a = −5.02, f1b = 27.00

TABLE 1

| Conditional Expression | Numerical Example 1 | Numerical Example 2 | Numerical Example 3 | Numerical Example 4 |
|---|---|---|---|---|
| (1) | G21:1.64 G22:1.64 | G21:1.85 G22:1.81 | G21:1.92 G22:1.91 | G21:2.03 G22:1.98 |
| (2) | 90.3 | 95.1 | 94.9 | 94.9 |
| (3) | −0.128 | −0.184 | −0.155 | −0.155 |
| (4) | 74.9 | 83.4 | 83.4 | 83.4 |
| (5) | 1.35 | 1.49 | 1.52 | 1.65 |
| (6) | 0.0371 | 0.0322 | 0.0391 | 0.0355 |
| (7) | 1.70 | 1.96 | 1.75 | 1.68 |
| (8) | 1.41 | 1.44 | 1.16 | 1.27 |
| (9) | 3.10 | 3.47 | 3.50 | 3.80 |
| (10) | 1.30 | 1.20 | 1.18 | 1.01 |
| (11) | 5.63 | 5.60 | 5.37 | 5.34 |
| (12) | 0.158 | 0.186 | 0.152 | 0.186 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-172023, filed Aug. 22, 2013, which is hereby incorporated by reference herein in its entirety.

What is claimed is:

1. A zoom lens, comprising, in sequential order from an object side to an image side:
    a first lens unit having a negative refractive power; and
    a second lens unit having a positive refractive power, the first lens unit and the second lens unit moving along respective loci different from each other during zooming,
    wherein the first lens unit includes a cemented lens G1b including a positive lens and a negative lens cemented to each other, and having a positive refractive power as a whole,
    wherein the second lens unit includes a positive lens satisfying conditional expressions, $85.0 < vd \leq 95.1$, $-0.25 < \theta Ct - (0.0047 \times vd + 0.546) < -0.10$, and $\theta Ct = (nC - nt)(nF - nC)$, where nC, nt and nF are refractive indices of a lens material for a C-line, a t-line and an F-line, respectively, and vd is an Abbe number for a d-line, and
    wherein conditional expressions, $0.016 < 1/vdp - 1/vdn < 0.060$, and $1.3 < hw/fw < 3.0$, are satisfied where vdp is an Abbe number of a material of the positive lens included in the cemented lens G1b, vdn is an Abbe number of a material of the negative lens included in the cemented lens G1b, hw is an incident height of marginal rays of an on-axis light flux passing through the positive lens included in the second lens unit at a wide angle end, and fw is a focal length of an entire system at the wide angle end.

2. The zoom lens according to claim 1,
    wherein the second lens unit includes a plurality of positive lenses, and
    wherein a conditional expression, $74.0 < vdave \leq 83.4$, is satisfied where vdave is an average value of Abbe numbers of materials of positive lenses of the plurality of positive lenses included in the second lens unit for the d-line satisfying a conditional expression, $1.3 < hw/fw < 3.0$.

3. The zoom lens according to claim 1,
    wherein a conditional expression, $1.2 < f2/ft < 2.0$, is satisfied where f2 is a focal length of the second lens unit, and ft is a focal length of the entire system at a telephoto end.

4. The zoom lens according to claim 1, further comprising a cemented lens G2c including a positive lens and a negative lens that are arranged in sequential order from the object side to the image side, cemented to each other, the cemented lens G2c being disposed on a most image side of the second lens unit.

5. The zoom lens according to claim 4,
    wherein a conditional expression, $1.2 < f2c/f2 < 4.0$, is satisfied where f2 is a focal length of the second lens unit, and f2c is a focal length of the cemented lens G2c.

6. The zoom lens according to claim 1,
    wherein a conditional expression, $0.9 < |f1|/ft < 1.8$, is satisfied where ft is a focal length of the entire system at a telephoto end, and f1 is a focal length of the first lens unit.

7. The zoom lens according to claim 1,
    wherein a conditional expression, $2.5 < f2/fw < 4.0$, is satisfied where f2 is a focal length of the second lens unit.

8. The zoom lens according to claim 1,
    wherein the second lens unit includes a positive lens G21 and a positive lens G22 in sequential order from the object side to the image side, and a conditional expression, $0.8 < f21/f22 < 1.5$, is satisfied where f21 is a focal length of the positive lens G21, and f22 is a focal length of the positive lens G22.

9. The zoom lens according to claim 1, wherein, provided that a single lens or a cemented lens including multiple lenses cemented to each other is assumed as a lens component, the second lens unit comprises, in sequential order from the object side to the image side:
    a positive lens;
    a positive lens;
    a negative lens component; and
    a cemented lens G2c including a positive lens and a negative lens cemented to each other.

10. The zoom lens according to claim 1,
    wherein a conditional expression, $5.1 < TLw/f2 < 7.0$, is satisfied where f2 is a focal length of the second lens unit, and TLw is a total lens length at the wide angle end.

11. The zoom lens according to claim 1, wherein the first lens unit comprises, in sequential order from the object side to the image side:
- a meniscus-shaped negative lens G11 having a convex surface on the object side;
- a biconcave-shaped negative lens G12; and
- a cemented lens G1b including a negative lens G13 and a positive lens G14 cemented to each other and having a positive refractive power as a whole, and wherein a conditional expression, $$0.10 < -f1a/f1b < 0.22,$$

is satisfied where f1a is a combined focal length of the negative lens G11 and the negative lens G12, and f1b is a focal length of the cemented lens G1b.

12. An image pickup device comprising:
- a zoom lens; and
- an image sensor configured to receive an image formed by the zoom lens,
- wherein the zoom lens comprises, in sequential order from an object side to an image side: a first lens unit having a negative refractive power; and a second lens unit having a positive refractive power, the first lens unit and the second lens unit moving along respective loci different from each other during zooming,
- wherein the first lens unit includes a cemented lens G1b including a positive lens and a negative lens cemented to each other, and having a positive refractive power as a whole,
- wherein the second lens unit includes a positive lens satisfying conditional expressions, $$85.0 < vd \leq 95.1,$$

$$-0.25 < \theta Ct - (0.0047 \times vd + 0.546) < -0.10, \text{ and}$$

$$\theta Ct = (nC - nt)/(nF - nC),$$

where nC, nt and nF are refractive indexes of a lens material for a C-line, a t-line and an F-line, respectively, and vd is an Abbe number for a d-line, and wherein conditional expressions, $$0.016 < 1/vdp - 1/vdn < 0.060, \text{ and}$$

$$1.3 < hw/fw < 3.0,$$

are satisfied where vdp is an Abbe number of a material of the positive lens included in the cemented lens G1b, vdn is an Abbe number of a material of the negative lens included in the cemented lens G1b, hw is an incident height of marginal rays of an on-axis light flux passing through the positive lens included in the second lens unit at a wide angle end, and fw is a focal length of an entire system at the wide angle end.

13. An image pickup device according to claim 12, further comprising a correcting unit that corrects an aberration of the zoom lens through an image processing.

14. A zoom lens comprising, in sequential order from an object side to an image side:
- a first lens unit having a negative refractive power; and
- a second lens unit having a positive refractive power, the first lens unit and the second lens unit moving along respective loci different from each other during zooming,
- wherein the second lens unit includes a positive lens satisfying conditional expressions, $$85.0 < vd \leq 95.1,$$

$$-0.25 < vCt - (0.0047 \times vd + 0.546) < -0.10, \text{ and}$$

$$\theta Ct = (nC - nt)/(nF - nC),$$

where nC, nt and nF are refractive indices of a lens material for a C-line, a t-line and an F-line, respectively, and vd is an Abbe number for a d-line, wherein the zoom lens further comprises a cemented lens G2c including a positive lens and a negative lens that are arranged in sequential order from the object side to the image side, cemented to each other, the cemented lens G2c being disposed on a most image side of the second lens unit, and wherein a conditional expression, $$1.3 < hw/fw < 3.0,$$

is satisfied where hw is an incident height of marginal rays of an on-axis light flux passing through the positive lens included in the second lens unit at a wide angle end, and fw is a focal length of an entire system at the wide angle end.

* * * * *